United States Patent [19]
Phaal

[11] Patent Number: 4,724,728
[45] Date of Patent: Feb. 16, 1988

[54] DRILL BLANKS

[76] Inventor: Cornelius Phaal, 34 Rutland Avenue, Craighall Park, Johannesburg, Transvaal, South Africa

[21] Appl. No.: 927,248

[22] Filed: Nov. 4, 1986

[30] Foreign Application Priority Data

Nov. 4, 1985 [ZA] South Africa ............. 85/8452

[51] Int. Cl.$^4$ .............................. B21K 5/02
[52] U.S. Cl. ................. 76/108 R; 76/DIG. 12
[58] Field of Search ......... 76/108 R, 108 T, 101 R, 76/DIG. 11, DIG. 12

[56] References Cited
FOREIGN PATENT DOCUMENTS
0547333 4/1977 U.S.S.R. ................. 76/108 T

*Primary Examiner*—Roscoe V. Parker
*Attorney, Agent, or Firm*—Scully, Scott, Murphy & Presser

[57] ABSTRACT

A method is provided of making a drill blank comprising a cylindrical carbide body 24 having a vein 26 of an abrasive compact embedded in one end thereof and bonded to the carbide. A method involves the steps of providing a solid, cylindrical body 10 of cemented carbide, forming a series of grooves 12 in one end surface 14 thereof, placing compact forming material in the grooves, exposing the cylindrical body to temperature and pressure conditions suitable to produce an abrasive compact of the material in the grooves, and severing the cylindrical body from one end surface 14 to the opposite end surface 20 to produce a plurality of the drill blanks.

6 Claims, 2 Drawing Figures

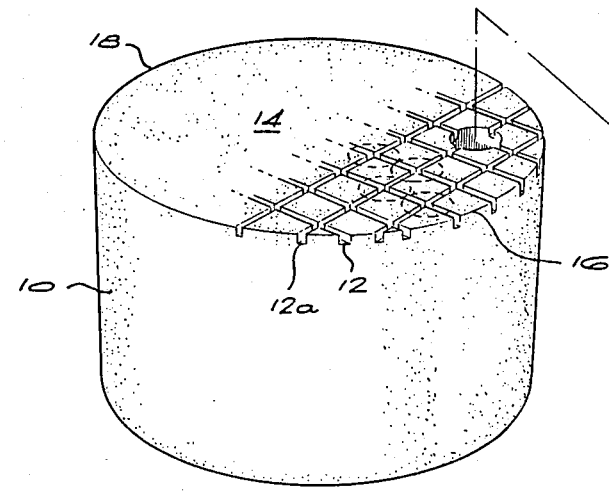
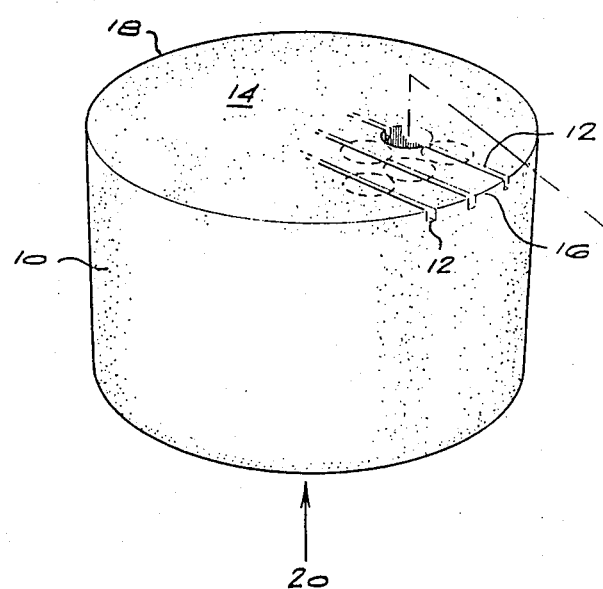

DRILL BLANKS

BACKGROUND OF THE INVENTION

This invention relates to drill blanks.

Small drill bits are used extensively for drilling holes in printed circuit boards. One such drill bit consists of a cemented carbide cylinder having an abrasive compact bonded to one end thereof or located in a groove in one end thereof. The abrasive compact may be a diamond or cubic boron nitride abrasive compact, but is generally a diamond compact.

SUMMARY OF THE INVENTION

According to the present invention, there is provided a method of making a drill blank comprising a cylindrical carbide body having a vein of an abrasive compact embedded in a groove at one end thereof and bonded to the carbide including the steps of providing a solid cylindrical body of cemented carbide having end surfaces joined by a side surface, forming a series of grooves in one end surface, placing compact-forming material in the grooves, exposing the cylindrical body to temperature and pressure conditions suitable to produce an abrasive compact of the material in the grooves, and severing the cylindrical body longitudinally from one end surface to the opposite end surface to produce a plurality of the drill blanks.

DESCRIPTION OF THE DRAWINGS

FIGS. 1 and 2 illustrate cylindrical bodies suitable for use in the method of the invention.

DETAILED DESCRIPTION OF THE INVENTION

The compact is formed in situ in the grooves and this ensures that a strong in situ bond is formed between the carbide and the compact during manufacture. The compact may be a cubic boron nitride or a diamond compact, but is preferably a diamond compact. The compact forming material will vary according to the nature of the compact being produced. In the case of a diamond compact, it is preferable that the compact forming material consists of a mass of diamond particles. Binder metal, for example cobalt, nickel or iron, from the carbide will infiltrate into the diamond mass during compact manufacture and form a second phase for the compact. This infiltration ensures that a direct and strong bond between the compact and the carbide is produced.

The series of grooves preferably comprises parallel grooves extending from one side of the end surface to the other. In another form of the invention, the series of grooves comprises two series of parallel grooves each extending from one side of the end surface to the other, the two series crossing each other to form a grid-like pattern. Each parallel groove is preferably equidistantly spaced from the its neighbour.

The cemented carbide body may be severed by methods known in the art. Preferred methods of severing are laser cutting and spark erosion. The same methods or a diamond cutting wheel may be used to form the grooves in the cemented carbide body.

The abrasive compact forming conditions are known in the art. Typically, these conditions are a temperature in the range 1500° to 2000° C. and a pressure in the range 50 to 70 kilobars.

Each drill blank which is produced will have at least one groove formed in an end thereof. Located in this groove will be an abrasive compact providing a vein of abrasive compact for the drill blank. The grooves will preferably be located substantially centrally across the end in which they are formed and will extend from one side of that end to the other. Where the drill blank has more than one groove formed in an end thereof, it is preferable that the grooves form a cross in that end, each groove extending from one side of the end to the other.

The drill blanks may be micro drill blanks suitable for drilling holes in printed circuit boards. Typically these drill blanks will have a diameter of 1 to 2 mm, a length of 8 to 20 mm and a depth of groove of about 2 to 3 mm. The drill blanks may also be macro drill blanks suitable for drilling larger holes. The diameter and length of such drill blanks will be much larger and the depth of the grooves will generally be 4 to 6 mm.

Examples of various widths and depths of grooves which may be used are:

| WIDTH (mm) | DEPTH (mm) |
| --- | --- |
| 0.6 | 1.3 |
| 1.5 | 5.2 |
| 3.2 | 7.4 |
| 1.6 | 5.3 |
| 1.2 | 1.7 |
| 0.5 | 7.5 |
| 1.3 | 7.5 |
| 2.0 | 7.5 |

Drill bits may be produced from the drill blanks by providing suitable flutes down the lengths thereof. Fluting of the drill blanks may be achieved by methods known in the art.

Two embodiments of the invention will now be described with reference to the accompanying drawings. Referring first to FIG. 1, a right circular cylindrical cemented carbide body 10 has a series of grooves 12 cut into one end 14 thereof by means of a diamond cutting wheel. Each groove extends from one side 16 of the end surface to the other side 18. A mass of fine diamond particles is then packed into these grooves. the loaded cemented carbide body is placed in the reaction zone of a conventional high temperature/high pressure apparatus and subjected to temperature and pressure conditions suitable for diamond compact manufacture. The cemented carbide body is a cemented tungsten carbide body containing cobalt as a binder metal. Cobalt from the cemented carbide body will infiltrate into the diamond particles and a compact will be produced in the grooves. The diamond compact will be firmly bonded to the cemented carbide body as a result of this in situ bond formation. The cemented carbide body is recovered from the reaction zone. The drill blanks are produced by severing the cemented carbide body 10 longitudinally from one end surface 14 to the other end surface 20 in the manner illustrated by FIG. 1. It will be noted that each drill blank 22 is a right circular cylinder 24 of smaller diameter than the body 10, but of the same length. Furthermore, each drill blank has a compact vein 26 centrally located in an end thereof. A drill bit may be formed from this blank by forming helical flutes longitudinally down the sides 28 of the blank in known manner.

The embodiment of FIG. 2 is similar to that of FIG. 1 and like parts carry like numerals. The difference in this embodiment is that two series 12, 12a of parallel grooves at right angles to each other are provided. The resulting drill blanks will each have compact veins 26, 26a in one end thereof which take the form of a cross.

I claim:

1. A method of making a drill blank comprising a cylindrical carbide body having a vein of an abrasive compact embedded in one end thereof and bonded to the carbide including the steps of providing a solid, cylindrical body of cemented carbide having end surfaces joined by a side surface, forming a series of grooves in one end surface, placing compact-forming material in the grooves, exposing the cylindical body to temperature and pressure conditions suitable to produce an abrasive compact of the material in the groove, and severing the cylindrical body from the one end surface to the opposite end surface to produce a plurality of the drill blanks.

2. A method of claim 1 wherein the series of grooves comprises parallel grooves extending from one side of the end surface to the other side.

3. A method of claim 1 wherein the series of grooves comprises two series of parallel grooves each extending from one side of the end surface to the other side, the two series crossing each other to form a grid-like pattern.

4. A method according to claim 1 wherein the compact forming material is a mass of diamond particles, binder metal from the cemented carbide infiltrating into the diamond mass during production of the compact.

5. A method according to claim 1 wherein abrasive compact-forming conditions are a temperature in the range 1500° to 2000° C. and a pressure in the range 50 to 70 kilobars.

6. A method according to claim 1 wherein the severing takes place by laser cutting or spark erosion.

* * * * *